(12) United States Patent
Dowaki et al.

(10) Patent No.: US 11,318,441 B2
(45) Date of Patent: May 3, 2022

(54) HYDROGEN CHLORIDE REMOVING AGENT

(71) Applicants: Japan Blue Energy Co., Ltd., Tokyo (JP); Tokyo University of Science Foundation, Tokyo (JP)

(72) Inventors: Naoki Dowaki, Tokyo (JP); Mitsuo Kameyama, Tokyo (JP); Kiyoshi Dowaki, Tokyo (JP)

(73) Assignees: JAPAN BLUE ENERGY CO., LTD., Tokyo (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 0 days.

(21) Appl. No.: 16/631,595

(22) PCT Filed: Jul. 20, 2017

(86) PCT No.: PCT/JP2017/026370
§ 371 (c)(1),
(2) Date: Jan. 16, 2020

(87) PCT Pub. No.: WO2019/016927
PCT Pub. Date: Jan. 24, 2019

(65) Prior Publication Data
US 2020/0179901 A1 Jun. 11, 2020

(51) Int. Cl.
*B01J 20/04* (2006.01)
*B01D 53/68* (2006.01)
(Continued)

(52) U.S. Cl.
CPC .......... *B01J 20/043* (2013.01); *B01D 53/685* (2013.01); *B01J 20/12* (2013.01); *C10K 1/003* (2013.01);
(Continued)

(58) Field of Classification Search
CPC ....... B01J 20/043; B01J 20/12; B01D 53/685; B01D 2251/404; B01D 2251/606; B01D 2253/104; B01D 2253/106; C10K 1/003
(Continued)

(56) References Cited

U.S. PATENT DOCUMENTS 4,833,877 A * 5/1989 Ahland .................. B01D 53/34
60/781
2004/0258596 A1 12/2004 Hirano et al.
(Continued)

FOREIGN PATENT DOCUMENTS

JP 7-299327 A 11/1995
JP 8-82411 A 3/1996
(Continued)

OTHER PUBLICATIONS

International Search Report dated Sep. 5, 2017, issued in counterpart International Application No. PCT/JP2017/026370 (2 pages).

*Primary Examiner* — Anita Nassiri-Motlagh
(74) *Attorney, Agent, or Firm* — WHDA, LLP

(57) ABSTRACT

The present invention provides a new hydrogen chloride removing agent that exhibits a good hydrogen chloride removal effect at a relatively low temperature. The present invention preferably provides a new hydrogen chloride removing agent for removing hydrogen chloride contained in a hydrogen-chloride-containing gas, such as a pyrolysis gas, a combustion exhaust gas, a dry distillation gas, etc., especially hydrogen chloride contained in a biomass pyrolysis gas. The present invention relates to a hydrogen chloride removing agent characterized by containing a mixture of a calcium carbonate and an imogolite and/or a synthetic imogolite, and relates to a method for removing, by using said hydrogen chloride removing agent, hydrogen chloride
(Continued)

contained in a hydrogen-chloride-containing gas, especially hydrogen chloride contained in a biomass pyrolysis gas.

5 Claims, 3 Drawing Sheets

(51) Int. Cl.
  *B01J 20/12* (2006.01)
  *C10K 1/00* (2006.01)
(52) U.S. Cl.
  CPC .. *B01D 2251/404* (2013.01); *B01D 2251/606* (2013.01); *B01D 2253/104* (2013.01); *B01D 2253/106* (2013.01)
(58) Field of Classification Search
  USPC .......................................................... 423/240
  See application file for complete search history.

(56) References Cited

U.S. PATENT DOCUMENTS

2010/0096594 A1  4/2010  Dahlin et al.
2010/0203461 A1*  8/2010  Maly .......................... F23L 9/02
                                                              431/9
2014/0332724 A1*  11/2014  Tsangaris .................. C10J 3/726
                                                              252/373
2014/0369908 A1*  12/2014  Reardon ................ B01D 53/83
                                                              423/210
2017/0246613 A1*  8/2017  Chen ......................... C10K 1/12

FOREIGN PATENT DOCUMENTS

| JP | 9-225296 A | 9/1997 | |
| JP | 10-180089 A | 7/1998 | |
| JP | 2000-225319 A | 8/2000 | |
| JP | 2000-296312 A | 10/2000 | |
| JP | 2001-79340 A | 3/2001 | |
| JP | 2001-163658 A | 6/2001 | |
| JP | 2011-116573 A | 6/2011 | |
| JP | 2012-506483 A | 3/2012 | |
| JP | 2015150538 A * | 8/2015 | ............ B01J 20/043 |
| JP | 2016-34633 A | 3/2016 | |
| WO | 03/033115 A1 | 4/2003 | |

* cited by examiner

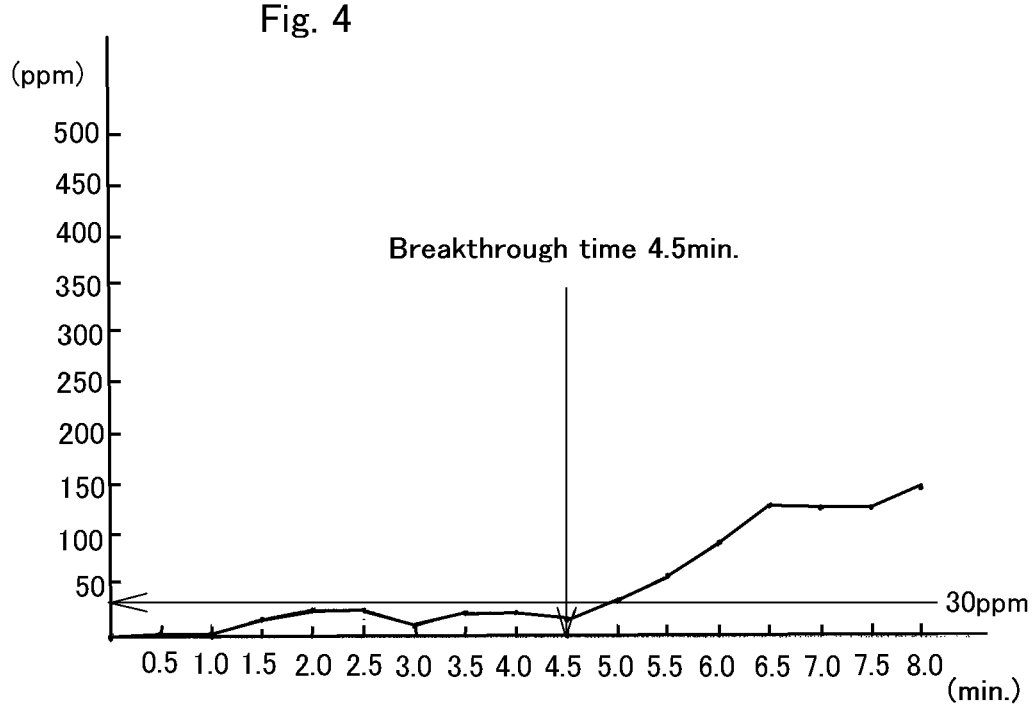

HYDROGEN CHLORIDE REMOVING AGENT

TECHNICAL FIELD

The present invention relates to a hydrogen chloride removing agent, more specifically relates to a hydrogen chloride removing agent for removing e.g. hydrogen chloride contained in a hydrogen chloride-containing gas such as a pyrolysis gas, a combustion exhaust gas, and a carbonization gas, particularly in a biomass pyrolysis gas, and relates to a method for removing hydrogen chloride contained in the hydrogen chloride-containing gas using the hydrogen chloride removing agent.

BACKGROUND ART

Fossil fuels such as coal and petroleum, general waste, combustible waste, food residue, biomass, e.g. wood, sewage sludge, livestock waste, and the like are incinerated or heat-treated as energy sources. At that time, a combustion exhaust gas is generated in the case of incineration, and a pyrolysis gas or a carbonization gas is generated in the case of heat treatment. The combustion exhaust gas generally includes sulfur oxide, hydrogen chloride, nitrate oxide, and the like, and the pyrolysis gas and the carbonization gas generally include hydrogen sulfide, hydrogen cyanide, and ammonia, and the like in addition to sulfur oxide, hydrogen chloride, and nitrate oxide.

The aforementioned substances contained in the combustion exhaust gas, the pyrolysis gas, and the carbonization gas are regarded as environmental pollutants. There are many known removing agents for removing these environmental pollutants and many known methods for removing these environmental pollutants using such removing agents. For example, a method for removing sulfur oxide and hydrogen chloride contained in an exhaust gas in a combustion facility has been proposed, which characteristically includes a step of bringing an exhaust gas generated by combustion of a combustible material into direct contact with a reducing agent such as calcium carbonate and slaked lime in a combustion furnace in which the combustible material is combusting in a high temperature region (Patent Document 1). The method has advantages of not only a compact apparatus but also an ability of removing sulfur oxide and hydrogen chloride at around a combustion temperature, because it is not necessary to install a sulfur oxide-removing facility and a hydrogen chloride-removing facility. However, the method has disadvantages of not only inefficiency but also generation of a large amount of incinerated ash, because it is necessary to add a large amount of calcium carbonate, slaked lime, and the like regardless of the sulfur content and the hydrogen chloride content in the exhaust gas.

A process for decontaminating a syngas produced in a fluidized bed gasifier has been proposed, which includes a) contacting a syngas with one or more adsorbents wherein the contacting is upstream of a catalytic candle filter to form a decontaminated syngas; and b) passing the decontaminated syngas through the candle filter containing a mixed cracking catalyst wherein ammonia and tar are removed, thereby producing a purified syngas (Patent Document 2). In the method, hydrogen sulfide, COS, $CS_2$, and the like in the gas are removed with lime, limestone or a ground product thereof, or calcium hydroxide, calcium carbonate, dolomite, or the like, and hydrogen chloride in the gas is removed with a calcium compound, and then the removed matters are filtered off using the candle filter. The method has merits that dusts and alkali metals (fly ash) besides sulfur compounds and hydrogen chloride can be filtered off and removed using a candle filter, and furthermore ammonia and tar can be removed through the candle filter. However, it is considered that since the removal ability of the method depends on the ability of the removing agent, it is essential to improve the performance by using a long-life removing agent. In addition, there has been a problem that the candle filter should be frequently exchanged or backwashed to prevent clogging of the candle filter.

An apparatus for neutralizing a hydrogen chloride-containing gas has been proposed, which characteristically includes a vertically elongated treatment column, a calcium carbonate-charged layer housed in the column and having an aqueous phase at the bottom, and a gas introduction portion for feeding a hydrogen chloride-containing gas to a part of the calcium carbonate-charged layer above the aqueous phase, and a treated gas-discharging portion for emitting the treated gas from a space on the calcium carbonate-charged layer in the treatment column (Patent Document 3). In the method, the hydrogen chloride-containing gas is allowed to pass through a scrubber absorption column in which a calcium carbonate aqueous solution is circulated, so that the hydrogen chloride gas is removed. The method has an advantage that a large amount of hydrogen chloride-containing gas can be simply treated at room temperature. However, in the method, there is a concern that, in a process of cooling a combustion exhaust gas or a pyrolysis gas, moisture is dew-condensed inside of pipes, into which hydrogen chloride dissolves to generate hydrochloric acid, resulting in apparatus troubles such as corrosion of the pipes on the way. Thus, for avoiding the phenomenon that moisture is dew-condensed inside of pipes, into which hydrogen chloride dissolves to generate hydrochloric acid, it is essential to carry out the dehydrochlorination treatment at a temperature higher than the temperature at which such a phenomenon occurs, i.e. at 150° C. or higher.

An exhaust gas treatment agent has been proposed, which is characteristically composed of a mixture of: limestone including 90 wt % or more of particles having a long-diameter dimension of 3 to 10 mm; and a particulate formed body containing 80 wt % or more of at least one compound selected from a group consisting of calcium hydroxide and calcium carbonate and including 90 wt % or more of particles having a long-diameter dimension of 3 to 10 mm (Patent Document 4). The exhaust gas treatment agent is disposed in a flue through which the exhaust gas passes, so that hydrogen chloride in the exhaust gas generated from an incinerator is removed. At this time, calcium hydroxide and calcium carbonate in the exhaust gas treatment agent absorb hydrogen chloride to generate calcium chloride, and the calcium chloride absorbs water, dissolves (deliquescence) and deforms during operation or stop of the incinerator, and thereby drift of the exhaust gas and clogging of the flue are caused in some cases. However, according to the method, a limestone granulated product is blended in the exhaust gas treatment agent, so that an effect of preventing the troubles as above can be obtained. Although the method is simple, the method has a disadvantage of decrease in a hydrogen chloride removing efficiency because a limestone lacking in hydrogen chloride removability is blended in the exhaust gas treatment agent.

To solve the aforementioned disadvantages in Patent Document 4, a two-component particulate dehydrochlorinating agent has been proposed, which is characterized in that, for example, a coating layer including a mixture of a neutralization-type dehydrochlorinating agent, e.g. a powder of quicklime, slaked lime, sodium carbonate, or calcium carbonate with a calcium silicate hydrate is formed on a surface of a nuclear grain e.g. limestone (Patent Document 5). According to the method, an advantage of effective dehydrochlorination treatment can be obtained because the whole surface of the hydrogen chloride removing agent has an effective dehydrochlorination ability. However, if the surface coating is inadequate, the hydrogen chloride removing agent such as calcium carbonate is wrapped by calcium silicate, causing a trouble that the hydrogen chloride removing ability cannot be exhibited, a trouble that the coating is peeled off and the limestone is exposed, hydrogen chloride cannot be removed, and the like. In the case of such a coating treatment, there has been a disadvantage that the hydrogen chloride-removing ability is affected by a completion degree of the coating technique.

Also, a method for removing hydrogen chloride in an incinerator has been proposed, which is characterized in that calcium carbonate particles and iron oxide particles coexist during combustion when combusting a substance to be incinerated that generates hydrogen chloride by incineration (Patent Document 6). The method is characterized in that, by mixing calcium carbonate with iron oxide having a high reactivity with hydrogen chloride, dehydrochlorination treatment can be more efficiently carried out than dehydrochlorination treatment with calcium carbonate alone. In the method, iron oxide and calcium carbonate are put into an incinerator and dehydrochlorination is carried out while incinerating the iron oxide and calcium carbonate at the same time, and the method has a disadvantage that incinerated ash increases.

PRIOR ART DOCUMENTS

Patent Documents

Patent Document 1: Japanese Patent Application Laid-Open No. 2001-79340
Patent Document 2: Japanese Unexamined Patent Application No. 2012-506483
Patent Document 3: Japanese Patent Application Laid-Open No. Hei7-299327
Patent Document 4: Japanese Patent Application Laid-Open No. Hei10-180089
Patent Document 5: Japanese Patent Application Laid-Open No. 2000-225319
Patent Document 6: Japanese Patent Application Laid-Open No. Hei8-82411

SUMMARY OF INVENTION

Problem to be Solved

The present invention provides a novel hydrogen chloride removing agent that can not only exhibit a good hydrogen chloride removing effect at a relatively low temperature but also maintain the good hydrogen chloride removing effect for a relatively long time. Preferably the present invention provides a novel hydrogen chloride removing agent that is useful for removing hydrogen chloride contained in a hydrogen chloride-containing gas such as a pyrolysis gas, a combustion exhaust gas, and a carbonization gas, particularly hydrogen chloride contained in a biomass pyrolysis gas.

Solution to Problem

In a method for removing hydrogen chloride in a hydrogen chloride-containing gas, calcium carbonate has been generally used as a hydrogen chloride removing agent. However, as explained above as prior art, the method has had various problems about the apparatus, the removing ability, and the like. Thus, the inventors of the present invention conducted various studies on how to increase the hydrogen chloride removal efficiency when using the calcium carbonate as a hydrogen chloride removing agent. First, the inventors focused on a circumstance that the removal of hydrogen chloride by calcium carbonate was normally carried out at as high as 600 to 800° C., and continued their study based on the viewpoint of decreasing this temperature. Efficient removal of hydrogen chloride at a low temperature can contribute to significant reduction of an apparatus cost and an operation cost. As a result, as described below, it was found that when imogolite and/or synthetic imogolite were added to calcium carbonate and used as a hydrogen chloride removing agent, a good hydrogen chloride removing effect was exhibited at a relatively low temperature, and furthermore the good hydrogen chloride removing effect could be maintained for a relatively long time, and this finding led to completion of the present invention.

That is, the present invention is: (1) a hydrogen chloride removing agent containing a mixture of calcium carbonate and imogolite and/or synthetic imogolite.

A preferable aspect of the present invention includes:
(2) the hydrogen chloride removing agent according to (1), wherein a mass ratio of calcium carbonate to imogolite and/or synthetic imogolite in the mixture is 100:5 to 100:50;
(3) the hydrogen chloride removing agent according to (1), wherein the mass ratio of calcium carbonate to imogolite and/or synthetic imogolite in the mixture is 100:10 to 100:30;
(4) the hydrogen chloride removing agent according to (1), wherein the mass ratio of calcium carbonate to imogolite and/or synthetic imogolite in the mixture is 100:15 to 100:25;
(5) the hydrogen chloride removing agent according to any one of (1) to (4), the hydrogen chloride removing agent is for removing hydrogen chloride contained in a hydrogen chloride-containing gas;
(6) the hydrogen chloride removing agent according to any one of (1) to (4), the hydrogen chloride removing agent is for removing hydrogen chloride contained in a pyrolysis gas, a combustion exhaust gas, or a carbonization gas; and
(7) the hydrogen chloride removing agent according to any one of (1) to (4), the hydrogen chloride removing agent is for removing hydrogen chloride contained in a biomass pyrolysis gas.

In addition, the present invention is;
(8) a method for removing hydrogen chloride from a hydrogen chloride-containing gas using a hydrogen chloride removing agent, wherein the hydrogen chloride removing agent contains a mixture of calcium carbonate and imogolite and/or synthetic imogolite.

A preferable aspect of the present invention includes:
(9) the method according to (8), wherein a mass ratio of calcium carbonate to imogolite and/or synthetic imogolite in the mixture is 100:5 to 100:50;
(10) the method according to (8), wherein the mass ratio of calcium carbonate to imogolite and/or synthetic imogolite in the mixture is 100:10 to 100:30;
(11) the method according to (8), wherein the mass ratio of calcium carbonate to imogolite and/or synthetic imogolite in the mixture is 100:15 to 100:25;

(12) the method according to any one of (8) to (11), wherein the removal of hydrogen chloride is performed at a temperature of 100 to 350° C.;

(13) the method according to any one of (8) to (11), wherein the removal of hydrogen chloride is performed at a temperature of 150 to 250° C.;

(14) the method according to any one of (8) to (11), wherein the removal of hydrogen chloride is performed at a temperature of 200 to 250° C.;

(15) the method according to any one of (8) to (14), wherein the removal of hydrogen chloride is performed at a pressure of 0.090 to 0.150 MPa;

(16) the method according to any one of (8) to (14), wherein the removal of hydrogen chloride is performed at a pressure of 0.100 to 0.120 MPa;

(17) the method according to any one of (8) to (16), wherein the hydrogen chloride-containing gas is a pyrolysis gas, a combustion exhaust gas, or a carbonization gas; and

(18) the method according to any one of (8) to (16), wherein the hydrogen chloride-containing gas is a biomass pyrolysis gas.

Effects of Invention

The hydrogen chloride removing agent according to the present invention can not only exhibit a good hydrogen chloride removing effect at a relatively low temperature but also maintain the good hydrogen chloride removing effect for a relatively long time. In addition, the hydrogen chloride removing agent according to the present invention is relatively easy to obtain because it is a mixture of calcium carbonate and imogolite and/or synthetic imogolite. In addition, the hydrogen chloride removing agent according to the present invention does not need to be processed and treated into a special shape because calcium carbonate and imogolite and/or synthetic imogolite are simply mixed and used. In addition, the hydrogen chloride removing agent according to the present invention is extremely inexpensive because of no need of a special apparatus for use.

BRIEF DESCRIPTION OF DRAWINGS

FIG. 4 is a graph showing a change in an amount (ppm by volume) of hydrogen chloride eluted into pure water every 30 seconds from a starting time of flow of the hydrogen chloride-containing gas, in Comparative Example 2.

DESCRIPTION OF EMBODIMENTS

Figure 1:
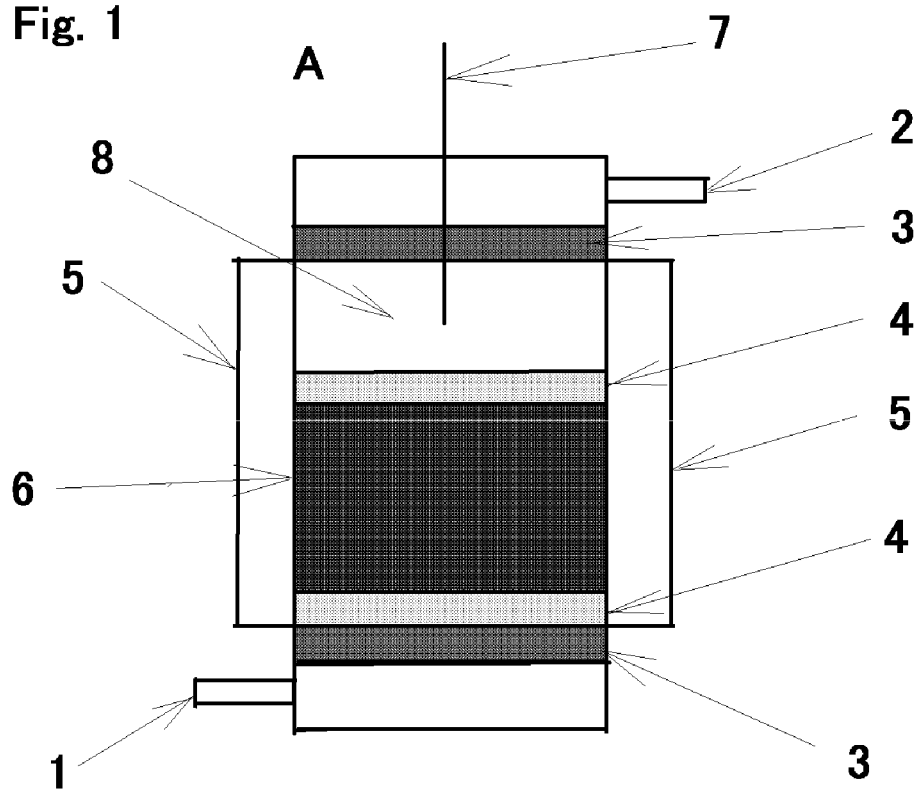
FIG. 1 is a schematic drawing of a hydrogen chloride removing apparatus used in Examples.

The hydrogen chloride removing agent according to the present invention characteristically contains a mixture of calcium carbonate and imogolite and/or synthetic imogolite. Herein, the synthetic imogolite refers to a synthesized amorphous aluminum silicate, for which a commercially available product e.g. HASClay (registered trademark) manufactured by TODA KOGYO CORP. can be used. The upper limit of the mass ratio of calcium carbonate to imogolite and/or synthetic imogolite in the mixture is preferably 50 parts by mass, more preferably 30 parts by mass, further preferably 25 parts by mass, even more preferably 20 parts by mass, whereas the lower limit of the mass ratio is preferably 5 parts by mass, more preferably 10 parts by mass, even more preferably 15 parts by mass, based on 100 parts by mass of calcium carbonate. If the mass ratio is less than the aforementioned lower limit, the mixture cannot exert a sufficient effect as a hydrogen chloride removing agent, an amount of removed hydrogen chloride is reduced, and furthermore a lifetime as a hydrogen chloride removing agent is shortened in some cases. Meanwhile, even if the mass ratio is more than the aforementioned upper limit, no remarkable increase in the effect as a hydrogen chloride removing agent is recognized, and the cost is increased in association with the increase in the ratio of imogolite and/or synthetic imogolite in some cases.

For the hydrogen chloride removing agent according to the present invention, the upper limit of a temperature at which hydrogen chloride is removed is preferably 350° C., more preferably 250° C., whereas the lower limit is preferably 100° C., more preferably 150° C., even more preferably 200° C. If the temperature is lower than the aforementioned lower limit, the effect obtained by mixing calcium carbonate with imogolite and/or synthetic imogolite cannot be sufficiently exerted, and the amount of the removed hydrogen chloride decreases in some cases. Meanwhile, if the temperature is higher than the aforementioned upper limit, the significance of mixing calcium carbonate with imogolite and/or synthetic imogolite i.e. the significance of enabling decrease of the temperature for removing hydrogen chloride is diminished, leading to increase in the thermal energy required for increasing the temperature, and a high cost due to facility reinforcement for increasing the temperature. In addition, a pressure for removing hydrogen chloride is preferably 0.090 to 0.150 MPa, more preferably 0.100 to 0.120 MPa. Normally, hydrogen chloride can be removed under atmospheric pressure.

The hydrogen chloride removing agent according to the present invention is not particularly limited as long as it is used for a hydrogen chloride-containing gas and can be used for any hydrogen chloride-containing gas. For example, the hydrogen chloride removing agent according to the present invention can be used for removing hydrogen chloride contained in a hydrogen chloride-containing gas such as a pyrolysis gas, a combustion exhaust gas, and a carbonization gas, and preferably used for removing hydrogen chloride contained particularly in a biomass pyrolysis gas.

Hereinafter, the present invention will be explained in more detail with reference to Examples, but the present invention is not limited to these Examples.

EXAMPLES

Substances and an apparatus used in Examples and Comparative Examples are as follows.
<Substances>
Calcium carbonate: powder, special grade, manufactured by Kanto Chemical Co., Inc. (average particle diameter: 12 to 15 μm)
Synthetic imogolite: HASClay GIII (trademark) manufactured by TODA KOGYO CORP. (pore volume: 1 cm$^3$/g, specific surface area: about 500 m$^2$/g)
<Apparatus>
FIG. 1 illustrates a schematic drawing of a hydrogen chloride removing apparatus (A) used in an experiment. The apparatus (A) is a flow-type hydrogen chloride removing apparatus, which is a stainless steel cylindrical apparatus having an outer diameter of 12.7 mm, an inner diameter of 10.7 mm, and a height of about 50 mm. In an inner lower part of the hydrogen chloride removing apparatus (A), a sintered filter (3) is disposed, on which a glass wool (4) is laid, on which a hydrogen chloride removing agent (6) is charged, which is further covered with the glass wool (4), on which the sintered filter (3) is disposed via a gas phase portion (8). Herein, a height of the portion charged with the hydrogen chloride removing agent (6), and a height of the gas phase portion (8) are approximately 25 to 28 mm and approximately 20 to 23 mm respectively depending on a charging amount of the hydrogen chloride removing agent (6). A gas used for removing hydrogen chloride is taken into the hydrogen chloride removing apparatus (A) from a gas introduction port (1) and rises in the hydrogen chloride removing apparatus (A), and after removing hydrogen chloride, the gas is discharged from a gas discharge port (2). A heater (5), which is a ribbon heater herein, is disposed outside the cylindrical apparatus. In addition, a temperature/pressure measuring apparatus (7) which can measure a temperature and a pressure inside the hydrogen chloride removing apparatus (A) is disposed in the gas phase portion (8) positioned on the upper part of the hydrogen chloride removing apparatus (A).

Example 1

As a hydrogen chloride removing agent, 0.1 g (10 parts by mass) of synthetic imogolite was used based on 1.0 g (100 parts by mass) of calcium carbonate. They were mixed by gentle agitation, and charged into a predetermined position (6) of the hydrogen chloride removing apparatus (A). Subsequently, nitrogen gas was flowed through the hydrogen chloride removing apparatus (A) at a rate of 200 ml/min to form a nitrogen atmosphere (oxygen-free atmosphere) inside the hydrogen chloride removing apparatus (A). Then, while maintaining the flow of the nitrogen gas, the temperature inside the hydrogen chloride removing apparatus (A) was increased to 200° C. by the ribbon heater as the heater (5). After confirming that the temperature became constant, the nitrogen gas was replaced with a hydrogen chloride-containing nitrogen gas (HCl: 1,160 ppm by volume, $N_2$: balance), the hydrogen-chloride-containing nitrogen gas was similarly flowed through the hydrogen chloride removing apparatus (A) at a rate of 200 ml/min, and while maintaining the temperature inside the hydrogen chloride removing apparatus (A) at 200° C., hydrogen chloride was removed. At this time, the pressure inside the hydrogen chloride removing apparatus (A) was 0.015 MPaG (0.116 MPa in absolute pressure).

Figure 2:
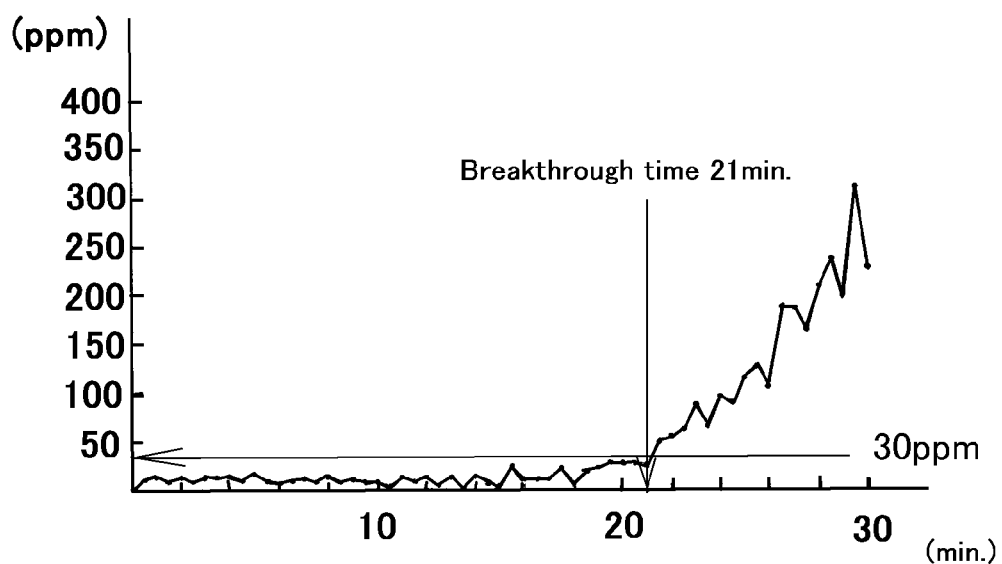
FIG. 2 is a graph showing a change in an amount (ppm by volume) of hydrogen chloride eluted into pure water every 30 seconds from a starting time of flow of a hydrogen chloride-containing nitrogen gas, in Example 1.

During the flow of the hydrogen chloride-containing nitrogen gas, a whole amount of an exhaust gas discharged from the gas discharge port (2) was flowed through 400 ml of pure water contained in a container, so that hydrogen chloride in the exhaust gas was eluted into pure water. At this time, pure water in the container was sufficiently stirred by a stirrer so that the whole content of the container was always wholly homogeneous. pH values of pure water into which hydrogen chloride was eluted were measured every 30 seconds from a starting time of flow of the hydrogen chloride-containing nitrogen gas, and thereby a change in pH values every 30 seconds was recorded. For measuring the pH values, a portable pH meter D-72 (trademark) manufactured by Horiba, Ltd. was used. Subsequently, from the change in the pH values (ΔpH) every 30 seconds measured in such a manner, amounts (ppm by volume) of hydrogen chloride eluted into pure water for 30 seconds corresponding to the measurement times were calculated. FIG. 2 shows the change in the amounts (ppm by volume) of hydrogen chloride eluted into pure water every 30 seconds from the starting time of flow of the hydrogen chloride-containing nitrogen gas. Then, a period from the starting time of flow of the hydrogen chloride-containing nitrogen gas until a pH measurement point immediately before the amount of hydrogen chloride eluted into pure water exceeded 30 ppm by volume for 30 seconds was recorded as a breakthrough time. The breakthrough time of the hydrogen chloride removing agent in the example was 21.0 minutes.

Based on the following equation (1), an amount of chlorine removed per 100 parts by mass of the hydrogen chloride removing agent until reaching the breakthrough time was calculated. This amount was used as an index for the amount of hydrogen chloride removed by the hydrogen chloride removing agent. In the above experiment, 0.70 parts by mass of chlorine could be removed, per 100 parts by mass of the hydrogen chloride removing agent (1.0 g of calcium carbonate and 0.1 g of synthetic imogolite; the total amount of 1.1 g).

[Equation 1]

$$Cl_{cap} = \frac{Fr * Frac * BT * \frac{1}{V} * \frac{1}{1000} * 35.45 * 100}{M_{adsorbent}} \quad (I)$$

In the above formula (I), Fr represents a flow rate [milliliter/min] of the hydrogen chloride-containing nitrogen gas, Frac represents a concentration [ppm by volume×$10^{-6}$] of hydrogen chloride in the hydrogen chloride-containing nitrogen gas, BT represents a breakthrough time [minute], V represents a molar volume [liter/mol] of the gas in a standard condition, and $M_{adsorbent}$ represents a used amount [g] of the hydrogen chloride removing agent. In addition, 35.45 in the equation refers to the atomic weight of chlorine (Cl). Herein, the concentration of hydrogen chloride in the hydrogen chloride-containing nitrogen gas was 1,160 ppm by volume, and the molar volume of the gas in the standard condition was 22.4 [liter/mol].

Comparative Example 1

Figure 3:
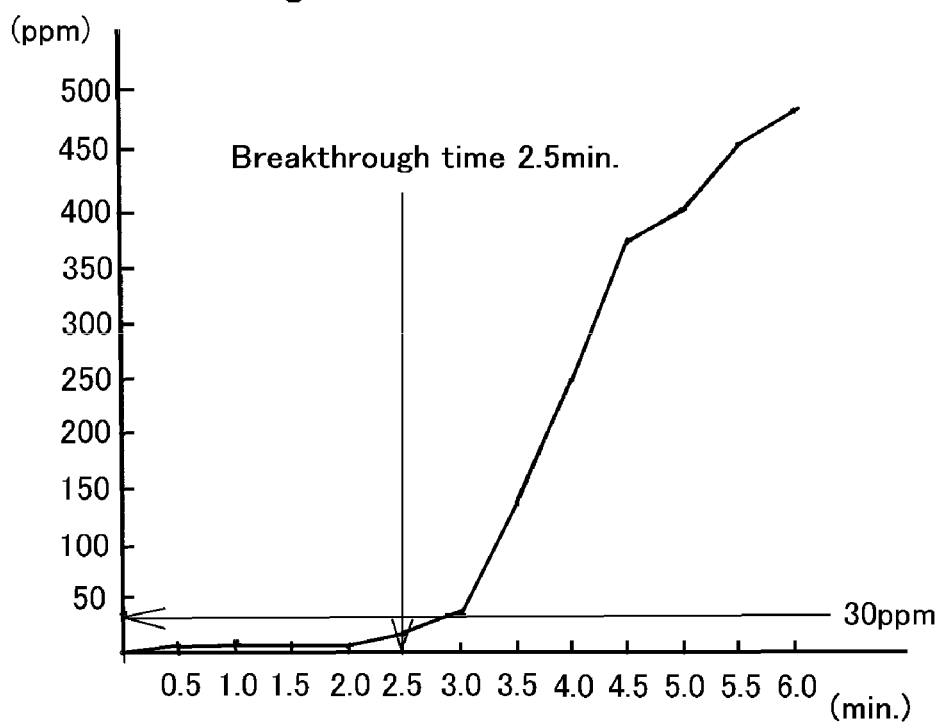
FIG. 3 is a graph showing a change in an amount (ppm by volume) of hydrogen chloride eluted into pure water every 30 seconds from a starting time of flow of the hydrogen chloride-containing gas, in Comparative Example 1.

Hydrogen chloride was removed in the same manner as in Example 1 except that the hydrogen chloride removing agent was changed to 1.0 g of calcium carbonate alone from the mixture of 1.0 g of calcium carbonate and 0.1 g of synthetic imogolite. FIG. 3 shows the change in the amounts (ppm by volume) of hydrogen chloride eluted into pure water every 30 seconds from the starting time of flow of the hydrogen chloride-containing nitrogen gas. A breakthrough time of the hydrogen chloride removing agent in Comparative Example 1 was 2.5 minutes.

In the experiment, 0.09 parts by mass of chlorine could be removed, per 100 parts by mass of the hydrogen chloride removing agent (1.0 g of calcium carbonate). Herein, the hydrogen chloride removing agent in Comparative Example 1 (1.0 g of calcium carbonate) corresponds to calcium carbonate in the hydrogen chloride removing agent in Example 1 (total amount of 1.1 g: 1.0 g of calcium carbonate and 0.1 g of synthetic imogolite). Thus, when the amount of the hydrogen chloride removing agent in Example 1 is 100 parts by mass, the amount of the hydrogen chloride removing agent in Comparative Example 1 is 90.9 parts by mass, and the corresponding amount of the removed chlorine is 0.08 parts by mass.

Comparative Example 2

Hydrogen chloride was removed in the same manner as in Example 1 except that the hydrogen chloride removing agent was changed to 0.1 g of synthetic imogolite alone from the mixture of 1.0 g of calcium carbonate and 0.1 g of synthetic imogolite. FIG. 4 shows the change in the amounts (ppm by volume) of hydrogen chloride eluted into pure water every 30 seconds from the starting time of flow of the hydrogen chloride-containing nitrogen gas. A breakthrough time of the hydrogen chloride removing agent was 4.5 minutes.

In the experiment, 1.65 parts by mass of chlorine could be removed, per 100 parts by mass of the hydrogen chloride removing agent. Herein, the hydrogen chloride removing agent in Comparative Example 2 (0.1 g of synthetic imogolite) corresponds to the synthetic imogolite in the hydrogen chloride removing agent in Example 1 (total amount of 1.1 g: 1.0 g of calcium carbonate and 0.1 g of synthetic imogolite). Thus, when the amount of the hydrogen chloride removing agent in Example 1 is 100 parts by mass, the amount of the hydrogen chloride removing agent in Comparative Example 2 is 9.1 parts by mass, and the corresponding amount of removed chlorine is 0.15 parts by mass.

Example 2

Hydrogen chloride was removed in the same manner as in Example 1 except that a temperature inside the hydrogen chloride removing apparatus (A) was 150° C. A breakthrough time of the hydrogen chloride removing agent was 15.5 minutes. 0.52 parts by mass of chlorine could be removed, per 100 parts by mass of the hydrogen chloride removing agent.

Comparative Example 3

Hydrogen chloride was removed in the same manner as in Comparative Example 1 except that a temperature inside the hydrogen chloride removing apparatus (A) was 150° C. A breakthrough time of the hydrogen chloride removing agent was 2.0 minutes. 0.07 parts by mass of chlorine could be removed, per 100 parts by mass of the hydrogen chloride removing agent. Here, similarly to Comparative Example 1, when the amount of the hydrogen chloride removing agent in Comparative Example 3 is converted to a calcium carbonate equivalent amount in the hydrogen chloride removing agent in Example 2, an amount of removed chlorine is 0.06 parts by mass.

Comparative Example 4

Hydrogen chloride was removed in the same manner as in Comparative Example 2 except that a temperature inside the hydrogen chloride removing apparatus (A) was 150° C. A breakthrough time of the hydrogen chloride removing agent was 9.0 minutes. 3.30 parts by mass of chlorine could be removed, per 100 parts by mass of the hydrogen chloride removing agent. Here, similarly to Comparative Example 2, when the amount of the hydrogen chloride removing agent in Comparative Example 4 is converted to a synthetic imogolite equivalent amount in the hydrogen chloride removing agent in Example 2, an amount of removed chlorine is 0.30 parts by mass.

Example 3

Hydrogen chloride was removed in the same manner as in Example 1 except that a temperature inside the hydrogen chloride removing apparatus (A) was 100° C. A breakthrough time of the hydrogen chloride removing agent was 15.0 minutes. 0.50 parts by mass of chlorine could be removed, per 100 parts by mass of the hydrogen chloride removing agent.

Comparative Example 5

Hydrogen chloride was removed in the same manner as in Comparative Example 1 except that a temperature inside the hydrogen chloride removing apparatus (A) was 100° C. A breakthrough time of the hydrogen chloride removing agent was 1.5 minutes. 0.06 parts by mass of chlorine could be removed, per 100 parts by mass of the hydrogen chloride removing agent. Here, similarly to Comparative Example 1, when the amount of the hydrogen chloride removing agent in Comparative Example 5 is converted to a calcium carbonate equivalent amount in the hydrogen chloride removing agent in Example 3, an amount of removed chlorine is 0.05 parts by mass.

Comparative Example 6

Hydrogen chloride was removed in the same manner as in Comparative Example 2 except that a temperature inside the hydrogen chloride removing apparatus (A) was 100° C. A breakthrough time of the hydrogen chloride removing agent was 11.0 minutes. 4.04 parts by mass of chlorine could be removed, per 100 parts by mass of the hydrogen chloride removing agent. Here, similarly to Comparative Example 2, when the amount of the hydrogen chloride removing agent in Comparative Example 6 is converted to a synthetic imogolite equivalent amount in the hydrogen chloride removing agent in Example 3, an amount of removed chlorine is 0.37 parts by mass.

Results in Examples 1 to 3 and Comparative Examples 1 to 6 are presented in the following Table 1.

TABLE 1

|  | Ex. 1 | Comp. Ex. 1 | Comp. Ex. 2 | Ex. 2 | Comp. Ex. 3 | Comp. Ex. 4 | Ex. 3 | Comp. Ex. 5 | Comp. Ex. 6 |
| --- | --- | --- | --- | --- | --- | --- | --- | --- | --- |
| Temperature inside the apparatus(° C) | 200 | 200 | 200 | 150 | 150 | 150 | 100 | 100 | 100 |
| Hydrogen chloride removing agent | | | | | | | | | |
| Calcium carbonate(g) | 1.0 | 1.0 | — | 1.0 | 1.0 | — | 1.0 | 1.0 | — |
| Synthetic imogolite(g) | 0.1 | — | 0.1 | 0.1 | — | 0.1 | 0.1 | — | 0.1 |
| Total amount(g) | 1.1 | 1.0 | 0.1 | 1.1 | 1.0 | 0.1 | 1.1 | 1.0 | 0.1 |
| Breakthrough time (min) | 21.0 | 2.5 | 4.5 | 15.5 | 2.0 | 9.0 | 15.0 | 1.5 | 11.0 |
| Amount of removed chlorine(pts · mass) | 0.70 | 0.08 | 0.15 | 0.52 | 0.06 | 0.30 | 0.50 | 0.05 | 0.37 |

TABLE 1-continued

| | Ex. 1 | Comp. Ex. 1 | Comp. Ex. 2 | Ex. 2 | Comp. Ex. 3 | Comp. Ex. 4 | Ex. 3 | Comp. Ex. 5 | Comp. Ex. 6 |
|---|---|---|---|---|---|---|---|---|---|
| Total amount of removed chlorine(pts · mass) | 0.70 | 0.23 | | 0.52 | 0.36 | | 0.50 | 0.42 | |
| Difference in amounts of removed chlorine(pts · mass) | | 0.47 | | | 0.16 | | | 0.08 | |

The amount of removed chlorine for each Comparative Example in Table 1 is a value converted to the calcium carbonate equivalent amount or the synthetic imogolite equivalent amount in the corresponding Example, respectively. A difference in the amounts of removed chlorine refers to a difference between the total amount of removed chlorine in each Example and the total amount of removed chlorine in two Comparative Examples corresponding to the each Example.

In Example 1, hydrogen chloride was removed from the hydrogen chloride-containing nitrogen gas using the mixture of 1.0 g (100 parts by mass) of calcium carbonate and 0.1 g (10 parts by mass) of synthetic imogolite as the hydrogen chloride removing agent at a temperature of 200° C. in the hydrogen chloride removing apparatus (A). The amount of removed chlorine as an index for the amount of removed hydrogen chloride was 0.70 parts by mass per 100 parts by mass of the hydrogen chloride removing agent, which was extremely preferable.

Meanwhile, in Comparative Example 1, hydrogen chloride was removed from the hydrogen chloride-containing nitrogen gas by using 1.0 g of calcium carbonate alone out of the mixture of 1.0 g of calcium carbonate and 0.1 g of synthetic imogolite, which was the hydrogen chloride removing agent used in Example 1. Additionally, in Comparative Example 2, hydrogen chloride was removed from the hydrogen chloride-containing nitrogen gas by using 0.1 g of synthetic imogolite alone out of the hydrogen chloride removing agent used in Example 1. In Comparative Example 1, the amount of removed chlorine as an index for the amount of removed hydrogen chloride was 0.08 parts by mass per 90.9 parts by mass of the calcium carbonate equivalent amount in Example 1. In Comparative Example 2, the amount of removed chlorine as an index for the amount of removed hydrogen chloride was 0.15 parts by mass per 9.1 parts by mass of the synthetic imogolite equivalent amount in Example 1. Thus, even the total amount of removed chlorine in Comparative Example 1 and Comparative Example 2 was 0.23 parts by mass (0.08+0.15 parts by mass) per 100 parts by mass (90.9+9.1 parts by mass) of the hydrogen chloride removing agent, which was remarkably small compared to 0.70 parts by mass of removed chlorine in Example 1.

As described above, in Example 1 using the hydrogen chloride removing agent obtained by mixing calcium carbonate (1.0 g) and synthetic imogolite (0.1 g), the amount of removed chlorine as the index for the amount of removed hydrogen chloride was 0.70 parts by mass per 100 parts by mass (1.1 g) of the hydrogen chloride removing agent. When compared with 0.23 parts by mass of the total amount of removed chlorine in the case of using calcium carbonate (1.0 g) alone in Comparative Example 1 and in the case of using synthetic imogolite (0.1 g) alone in Comparative Example 2, the difference in the amounts of removed chlorine between Example 1 and Comparative Examples 1, 2 was 0.47 parts by mass. As described above, it was found that when using the hydrogen chloride removing agent obtained by mixing calcium carbonate and synthetic imogolite, the amount of removed chlorine significantly increased compared to the total amount of removed chlorine in the cases of using calcium carbonate alone or synthetic imogolite alone.

In Example 2 and Comparative Examples 3 and 4, and Example 3 and Comparative Examples 5 and 6, hydrogen chloride was removed under the same conditions as in Example 1 and Comparative Examples 1 and 2, except that the temperature inside the hydrogen chloride removing apparatus (A) was 150° C. in Example 2 and Comparative Examples 3 and 4, and except that the temperature inside the hydrogen chloride removing apparatus (A) was 100° C. in Example 3 and Comparative Examples 5 and 6.

As is clear from the results in Table 1, it was found that the amount of removed chlorine as the index for the amount of removed hydrogen chloride in Example 2 was 0.52 parts by mass per 100 parts by mass (1.1 g) of the hydrogen chloride removing agent, which had significantly increased compared to 0.36 parts by mass of the total amount of Comparative Example 3 (0.06 parts by mass) and Comparative Example 4 (0.30 parts by mass) using calcium carbonate alone or synthetic imogolite alone. In addition, it was found that the amount of removed chlorine as the index for the amount of removed hydrogen chloride in Example 3 was 0.50 parts by mass per 100 parts by mass (1.1 g) of the hydrogen chloride removing agent, which had definitely increased compared to 0.42 parts by mass of the total amount of Comparative Example 5 (0.05 parts by mass) and Comparative Example 6 (0.37 parts by mass) using calcium carbonate alone or synthetic imogolite alone.

As described above, it was found that when using the hydrogen chloride removing agent obtained by mixing calcium carbonate and synthetic imogolite, the amount of removed chlorine as the index for the amount of removed hydrogen chloride significantly increased compared to the total sum of the amount of removed chlorine in the cases of using calcium carbonate alone and synthetic imogolite alone. As described above, it was recognized that when using the mixture of calcium carbonate and synthetic imogolite, an effect higher than the effect of the total sum of the amount in the cases of the respective single use, i.e. a synergistic effect could be exhibited in relation to the amount of removed chlorine as the index for the amount of removed hydrogen chloride. In addition, it was found that the synergistic effect became more remarkable as the temperature inside the hydrogen chloride removing apparatus (A) increased from 100 to 200° C., i.e. as the temperature for removing hydrogen chloride increased.

Example 4

Hydrogen chloride was removed in the same manner as in Example 1 except that a mixture of 1.0 g (100 parts by mass) of calcium carbonate and 0.05 g (5 parts by mass) of synthetic imogolite was used as the hydrogen chloride removing agent. A breakthrough time of the hydrogen chloride removing agent was 9.5 minutes. 0.33 parts by mass of chlorine could be removed, per 100 parts by mass of the hydrogen chloride removing agent.

Example 5

Hydrogen chloride was removed in the same manner as in Example 1 except that a mixture of 1.0 g (100 parts by mass) of calcium carbonate and 0.15 g (15.0 parts by mass) of synthetic imogolite was used as the hydrogen chloride removing agent. A breakthrough time of the hydrogen chloride removing agent was 25.5 minutes. 0.81 parts by mass of chlorine could be removed, per 100 parts by mass of the hydrogen chloride removing agent.

Example 6

Hydrogen chloride was removed in the same manner as in Example 1 except that a mixture of 1.0 g (100 parts by mass) of calcium carbonate and 0.20 g (20.0 parts by mass) of synthetic imogolite was used as the hydrogen chloride removing agent. A breakthrough time of the hydrogen chloride removing agent was 27.0 minutes. 0.83 parts by mass of chlorine could be removed, per 100 parts by mass of the hydrogen chloride removing agent.

The following Table 2 shows the change in the breakthrough time when changing the mixing amount of synthetic imogolite based on 1.0 g (100 parts by mass) of calcium carbonate in the hydrogen chloride removing agent.

TABLE 2

|  | Comp. Ex. 1 | Ex. 4 | Ex. 1 | Ex. 5 | Ex. 6 |
| --- | --- | --- | --- | --- | --- |
| Temperature inside the apparatus(° C.) | 200 | 200 | 200 | 200 | 200 |
| Hydrogen chloride removing agent |  |  |  |  |  |
| Calcium carbonate(g) | 1.0(100) | 1.0(100) | 1.0(100) | 1.0(100) | 1.0(100) |
| Synthetic imogolite(g) | 0(0) | 0.05(5) | 0.10(10) | 0.15(15) | 0.20(20) |
| Breakthrough time (min) | 2.5 | 9.5 | 21.0 | 25.5 | 27.0 |

In Table 2, a numerical value in parentheses refers to a value of an addition amount of each synthetic imogolite indicated by "parts by mass" when 1.0 g of calcium carbonate is taken as 100 parts by mass.

As is clear from Table 2, it was found that when using the mixture of calcium carbonate and synthetic imogolite as the hydrogen chloride removing agent, the lifetime (breakthrough time) of the hydrogen chloride removing agent significantly increased compared to the use of calcium carbonate alone. In addition, it was found that when increasing the mixing ratio of synthetic imogolite to calcium carbonate, the lifetime (breakthrough time) of the hydrogen chloride removing agent significantly increased.

INDUSTRIAL APPLICABILITY

The hydrogen chloride removing agent according to the present invention can not only have a good hydrogen chloride removing effect at a relatively low temperature but also maintain the good hydrogen chloride removing effect for a relatively long time. In addition, the hydrogen chloride removing agent according to the present invention is relatively easy to obtain because it is a mixture of calcium carbonate and imogolite and/or synthetic imogolite. In addition, the hydrogen chloride removing agent according to the present invention is extremely inexpensive because calcium carbonate and imogolite and/or synthetic imogolite are simply mixed and used. The hydrogen chloride removing agent according to the present invention is highly expected to be used for removing hydrogen chloride contained in a hydrogen chloride-containing gas such as a pyrolysis gas, a combustion exhaust gas and a carbonization gas, particularly in a biomass pyrolysis gas.

REFERENCE NUMERALS

A Hydrogen chloride removing apparatus used in an experiment
1 Gas introduction port
2 Gas discharge port
3 Sintered filter
4 Glass wool
5 Heater (ribbon heater)
6 Hydrogen chloride removing agent
7 Temperature/pressure measuring apparatus
8 Gas phase portion

The invention claimed is:

1. A method for removing hydrogen chloride from a hydrogen chloride-containing gas using a hydrogen chloride removing agent, wherein the hydrogen chloride removing agent consisting of a simple mixture of calcium carbonate and imogolite and/or synthetic imogolite, wherein a mass ratio of the calcium carbonate to the imogolite and/or the synthetic imogolite in the simple mixture is 100:5 to 100:10, wherein the removal of hydrogen chloride is performed at a temperature of 100 to 200° C.

2. The method according to claim 1, wherein the removal of hydrogen chloride is performed at a pressure of 0.100 to 0.120 MPa.

3. The method according to claim 1, wherein the hydrogen chloride-containing gas is a biomass pyrolysis gas.

4. The method according to claim 1, wherein the simple mixture is obtained by a process consisting of mixing the calcium carbonate with the imogolite and/or the synthetic imogolite.

5. The method according to claim 1, where the hydrogen chloride-containing gas is passed through a layer comprising the hydrogen chloride removing agent.

* * * * *